No. 799,414. PATENTED SEPT. 12, 1905.
C. M. STEELE.
BRICK TRUCK.
APPLICATION FILED OCT. 20, 1904.
2 SHEETS—SHEET 1.
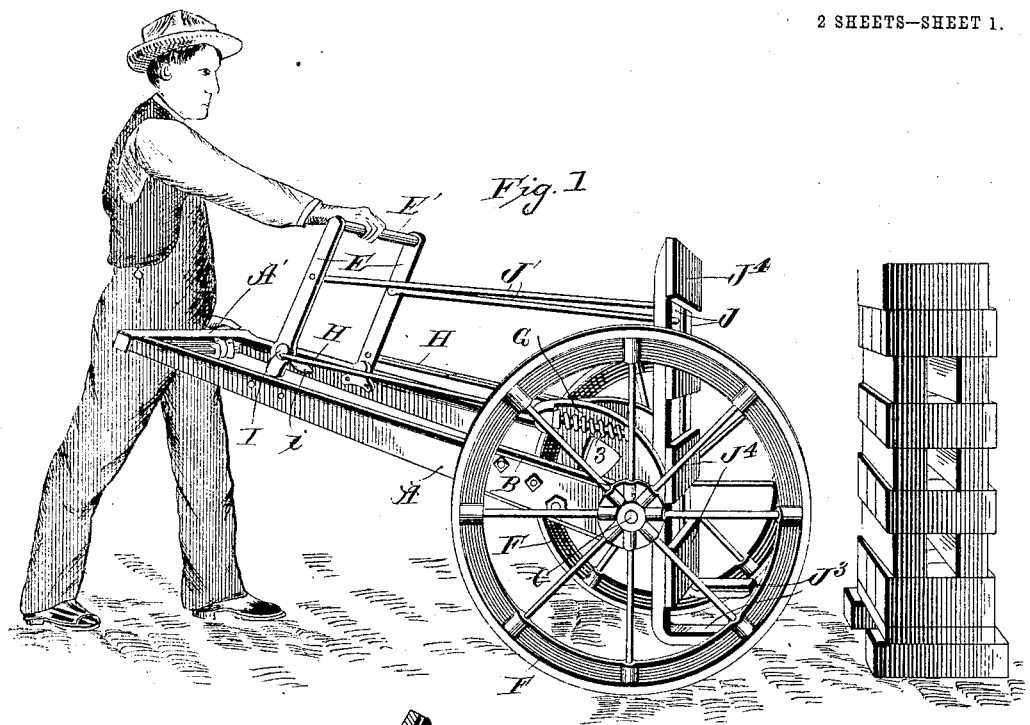
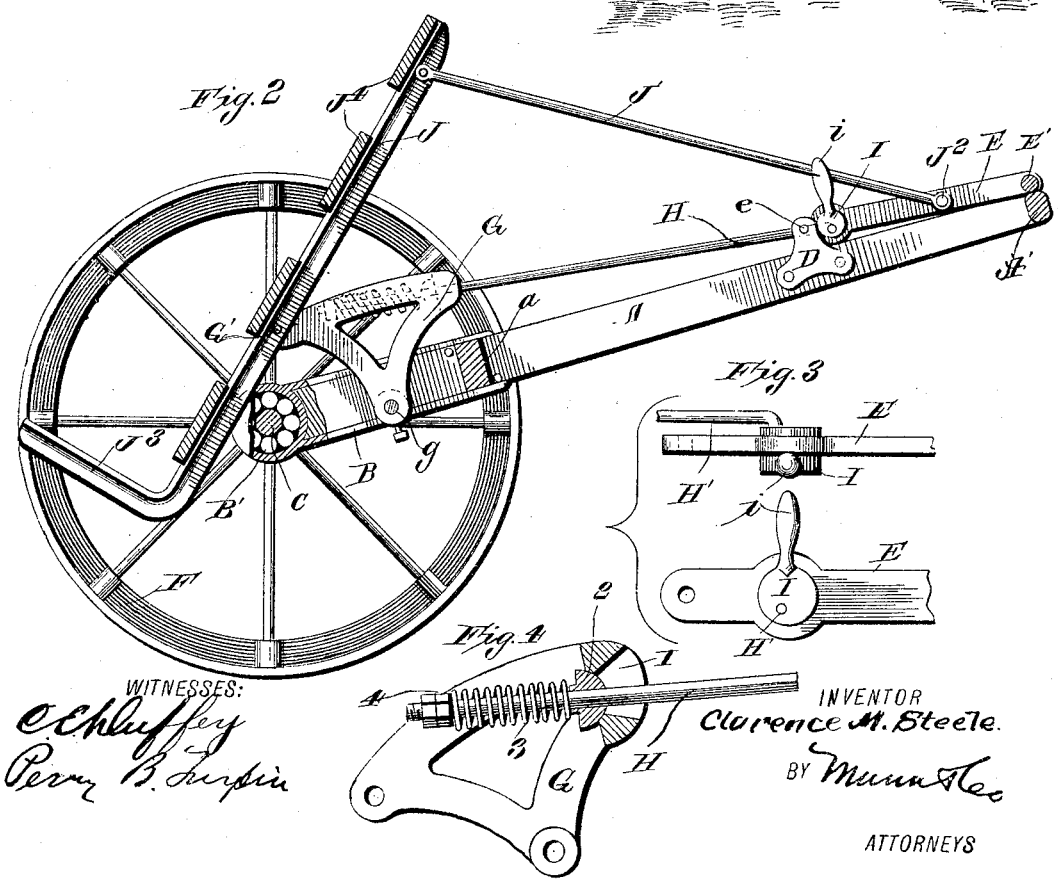

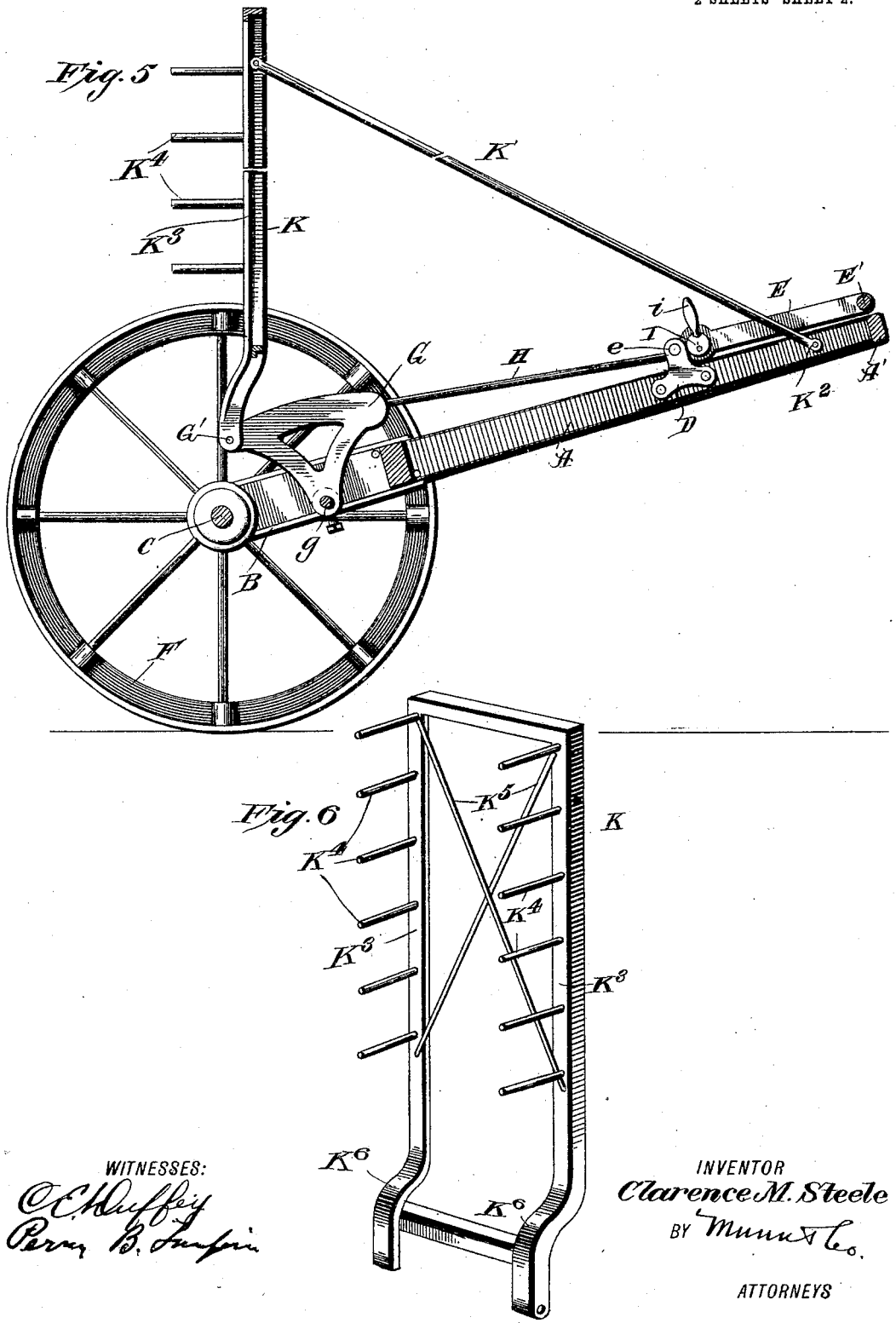

UNITED STATES PATENT OFFICE.

CLARENCE M. STEELE, OF STATESVILLE, NORTH CAROLINA.

BRICK-TRUCK.

No. 799,414. Specification of Letters Patent. Patented Sept. 12, 1905.

Application filed October 20, 1904. Serial No. 229,298.

*To all whom it may concern:*

Be it known that I, CLARENCE M. STEELE, a citizen of the United States, and a resident of Statesville, in the county of Iredell and State of North Carolina, have made certain new and useful Improvements in Brick-Trucks, of which the following is a specification.

My invention is an improvement in brick-trucks, and has for an object to provide a novel construction of truck including interchangeable frames, one for handling portable hacks and the other for handling pallets in racks; and the invention consists in certain novel constructions and combinations of parts, as will be hereinafter described and claimed.

In the drawings, Figure 1 is a perspective view, and Fig. 2 is a vertical longitudinal section, of a truck embodying my invention and provided with a frame for handling portable hacks. Fig. 3 illustrates in plan and side view the eccentric, constituting an adjustable connection between the handle-lever and one of the rocking arms. Fig. 4 is a side view, part in section, of the rocker, showing the yielding connection between the same and the rod leading to the handle-lever. Fig. 5 is a sectional elevation of the truck provided with a frame for handling pallets to stationary racks, and Fig. 6 is a detail perspective view of the pallet-frame.

The truck has a main frame, comprising side bars A and a cross-bar A', which may be grasped as a handle, and to the side bars A are secured the bearing-castings B, having bearings at B' for the axle C. The bearings B' may be supplied with suitable antifriction-bearings, as shown in Fig. 2. The side bars A are connected and braced by a cross-bar $a$, and to these side bars are secured ears or plates D, to which are pivoted at $e$ the handle-lever E, having the side bars and the cross-bar E', the latter resting in the position shown in Fig. 2 against or adjacent to the cross-bar A' of the main frame. The wheels F are supported on the axle C, one wheel being preferably pinned or otherwise secured to the axle and the other running loose on the axle and the axle turning in the roller-bearings, as shown in Fig. 2.

The rocking arms G are pivoted at their lower ends at $g$ to the main frame and preferably upon a cross-rod extending between the side bars A, as shown. These rocker-arms are connected at their upper ends by rods H and H' with the handle-levers E at a point adjacent to the pivots $e$ of the handle-lever, one of the said rods, shown as the rod H', being adjustably connected with the handle-lever so it can operate its respective rocker-arm G to a greater extent than the opposite rod H. This adjustable connection is preferably effected by securing the rod H' to an eccentric I, turning in the handle-lever and having a handle $i$, by which it may be turned to vary the operation of the corresponding rocker-arm G. To ease the shock in operating the rocker-arms in lifting the frames carried thereby, as presently described, I prefer to cushion the connecting-rods H and H', preferably in the manner shown in Fig. 4, in which the rod extends through an opening 1 in the rocker-arm, thence through a rocking washer 2, and receives a spring 3, which bears between said rocking washer and a stop 4 on the rod, as best illustrated in Fig. 4 of the drawings.

The frames J and K are pivotally connected at G' to the front upper ends of the rocking arms G, so that as the said rocking arms are swung from the position shown in Fig. 1 to that shown in Fig. 2 by the operation of the handle-lever the frames J or K, as the case may be, will be lifted to raise the objects they are designed to support. These adjustable frames J and K are braced at their upper ends, the frame J having a rod J' extending from its upper end rearwardly and connecting at $J^2$ with the handle-lever E, so that the said frame J as it is raised is tilted rearwardly at its upper end. The frame K is braced by the rod K', extending from its upper end rearwardly and connecting at $K^2$ with the side bars A of the main frame adjacent to the cross-bar A', the purpose being to brace the frame K in practically its upright position as it is raised by the operation of the handle-lever, as will be understood from Fig. 5 of the drawings. The connecting-rods may be made of piping for lightness and stiffness.

The lifting-frame J for handling portable hacks consists of two angle-irons bent forwardly at their lower ends at $J^3$ to extend beneath the load, as will be understood from Fig. 1, and the angle-bars are connected by the cross-slats $J^4$, which may be of wood and form a back against which the hack of brick may rest.

It will be understood that ordinarily the adjustable connection at I is only used in connection with the pallet-frame K, being for the purpose of raising or lowering one side of such frame in order to lean the frame one way or the other to cause the pallets to enter racks which may not be perpendicular.

As shown, the pallet-frame comprises the angle-iron bars $K^3$, having the forwardly-projecting fingers $K^4$ and bent at $K^6$ below the fingers in order to set the pivot G' approximately beneath the center of the load resting on the fingers in such manner as to balance the load, as will be understood from Figs. 5 and 6 of the drawings. The pallet-frame K may be braced by the diagonal rods $K^5$, as shown in Fig. 6.

In converting the truck from the construction shown in Fig. 2 to that shown in Fig. 5, in which it is adapted to handle pallets to and from stationary racks, the frame J may be disconnected at G' and its brace-rods J' be detached at $J^2$ and the frame K be applied and connected at G' and its brace-rods K' be connected at $K^2$, as shown in Fig. 5, the brace-rods K' being connected to the main frame, as before described, as it is desirable for the frame K to stand upright in use, as before suggested.

It will be noticed that in operation the handle-levers operate upon the rocking arms in such manner as to lift the frames J or K in the operation of the handle-levers; also, that the brace-rods J' are so connected that the handle-lever has to draw the frame J back far enough to balance the load in lifting the arms of the main frame.

Having thus described my invention, what I claim as new, and desire to secure by Letters Patent, is—

1. The improvement in brick-trucks herein described comprising the main frame having side bars, the wheels and the axle, the rocking arms pivoted at their lower ends in connection with the main frame, the handle-lever, rods connecting the handle-lever with the rocking arms, cushioning devices for said connecting-rods, an eccentric constituting an adjustable connection between one of said rods and the handle-lever, a frame supported by said rocking lever and a brace-rod for the upper end of such frame, substantially as set forth.

2. The combination in a brick-truck, of a main frame, the rocking arms adapted to carry a frame for supporting the load, the frame projecting above the rocking arms a handle-lever, connections between the rocking arms and the handle-lever and means for bracing the upper end of the frame, substantially as set forth.

3. The combination in a brick-truck with the main frame and the rocking arms for carrying the frame for supporting the load, of the handle-lever, rods extending between the handle-lever and the rocking arms, cushioning-springs on said rods and rocking washers between said springs and the rocking arms, substantially as set forth.

4. The combination in a brick-truck with the main frame and the rocking arms, of the handle-lever pivoted to the main frame, connections between the rocking arms and the handle-lever, a frame for supporting the load, said frame being pivoted to the rocking arms and brace-rods for the said load-supporting frame, said brace-rods being arranged above the connections between the rocking arms and the handle-lever.

5. The combination in a brick-truck of the main frame, the handle-lever, the rocking arms, connections between the rocking arms and the handle-lever, the load-supporting frame pivoted to the rocking arms and connections between said frame and the handle-lever whereby the operation of the handle-lever may draw the load-supporting frame back far enough to balance the load in lifting the handle portion of the main frame, substantially as set forth.

6. The combination in a brick-truck of a main frame, the rocking arms pivoted thereto, the handle-lever, the spring-cushioned rods connecting the rocking arms with the handle-lever, the load-supporting frame pivoted to the rocking arms and the brace-rods connecting the said load-supporting frame with the handle-lever whereby the load may be handled by one lever without tilting the main frame.

7. The combination of the main frame, the rocking arms pivoted to the main frame, the pallet-frame pivoted to the rocking arms, the handle-lever, rods connecting the handle-lever with the rocking arms, an eccentric for adjusting the connection between one of said rods and the handle-lever and brace-rods for the upper end of the pallet-frame substantially as set forth.

8. The combination in a brick-truck of a main frame and handle-lever pivoted to the main frame, a load-supporting frame, intermediate devices between the handle-lever and the load-supporting frame whereby the operation of the handle-lever may lift the load-supporting frame the latter projecting above its lifting device and brace-rods for the upper end of the frame, substantially as and for the purpose set forth.

9. The combination in a brick-truck, of the main frame, the rocking arms, a load-supporting frame pivoted to the rocking arms and having a portion projecting above said pivot, the handle-lever, rods connecting the handle-lever with the rocking arms, means for adjusting the connection between one of said rods and the handle-lever, and brace-rods for the upper end of the load-supporting frame, substantially as set forth.

10. The combination in a brick-truck, of a main frame, rockers pivoted at their lower ends to the main frame and projecting upwardly above said pivot, the load-supporting frame pivoted to said rocker and projecting upwardly above the same, the handle-lever connected with the rocker and brace devices for the upper end of the load-supporting frame, substantially as set forth.

CLARENCE M. STEELE.

Witnesses:
J. A. VAUGHAN,
J. H. ROCKWELL.